(12) United States Patent
Nam et al.

(10) Patent No.: US 8,397,854 B1
(45) Date of Patent: Mar. 19, 2013

(54) DRIVE WHEEL SUSPENSION

(75) Inventors: Ki Y. Nam, Newport Coast, CA (US); Richard Taras, Anaheim, CA (US); Hung Pham, Stanton, CA (US)

(73) Assignee: T3 Motion, Inc., Costa Mesa, CA (US)

( * ) Notice: Subject to any disclaimer, the term of this patent is extended or adjusted under 35 U.S.C. 154(b) by 0 days.

(21) Appl. No.: 13/405,127

(22) Filed: Feb. 24, 2012

(51) Int. Cl.
*B62D 61/06* (2006.01)
*B62K 5/02* (2006.01)

(52) U.S. Cl. ........ 180/213; 180/210; 180/211; 180/214; 180/217; 180/65.51

(58) Field of Classification Search .......... 180/210–217, 180/65.1, 65.51
See application file for complete search history.

(56) References Cited

U.S. PATENT DOCUMENTS

| | | | | |
|---|---|---|---|---|
| 3,190,676 A | * | 6/1965 | Junge | 280/273 |
| 3,433,318 A | * | 3/1969 | Packard | 180/213 |
| 3,512,599 A | * | 5/1970 | Haddix et al. | 180/217 |
| 3,570,620 A | * | 3/1971 | Fisher et al. | 180/214 |
| 3,964,563 A | * | 6/1976 | Allen | 180/217 |
| 4,263,977 A | * | 4/1981 | Willett | 180/11 |
| 4,541,501 A | * | 9/1985 | Kawasaki | 180/215 |
| 5,307,889 A | * | 5/1994 | Bohannan | 180/13 |
| 5,960,901 A | * | 10/1999 | Hanagan | 180/210 |
| 7,237,637 B2 | * | 7/2007 | Fecteau et al. | 180/210 |
| 2010/0071983 A1 | * | 3/2010 | Holland | 180/215 |

* cited by examiner

*Primary Examiner* — Ruth Ilan
*Assistant Examiner* — Darlene P Condra
(74) *Attorney, Agent, or Firm* — Blakely Sokoloff Taylor & Zafman LLP

(57) ABSTRACT

A drive wheel and suspension for a vehicle for mounting on a steering post to provide both a steering capability and propulsion to the vehicle. The drive wheel and suspension provides a spring suspension for that wheel of the vehicle, as well as what is effectively vehicle body mounting of the propulsion system so as to minimize un-sprung weight and to provide a compact assembly to support a suitable aesthetic and protective fender over the drive wheel and suspension.

8 Claims, 4 Drawing Sheets

DRIVE WHEEL SUSPENSION

BACKGROUND OF THE INVENTION

1. Field of the Invention

The present invention relates to the field of drive wheel suspension for vehicles.

2. Prior Art

T3 Motion, Inc., assignee of the present invention, now manufactures and sells the three-wheeled battery operated vehicle shown in FIG. 1. The vehicle is operated standing up, with all of the controls necessary being accessible on the handlebars. The vehicle has found wide application for security purposes, as it typically can operate all day in a typical application on a single charge, both indoors such as in shopping centers and outdoors for policing such areas as parking lots, parking structures, beach areas and the like. The vehicle has found wide use for such purposes not only because of its efficiency (cost of operation), but also because the operator is elevated somewhat, so can see over people for a better view of the area.

In the prior art vehicles as shown in FIG. 1, the wheels are rigidly mounted, that is, the rear wheels are rigidly mounted to the frame of the vehicle and the front wheel, which is the drive wheel, is rigidly mounted to the steering post, as in a typical tricycle. However because of the functionality and practical appeal of the vehicles, the same are being used in environments not having a particularly smooth operating surface, such as by way of example, poorly maintained parking lots and the like where rigid mounting of the vehicle substantially affects performance.

DETAILED DESCRIPTION OF THE PREFERRED EMBODIMENTS

Figure 1:
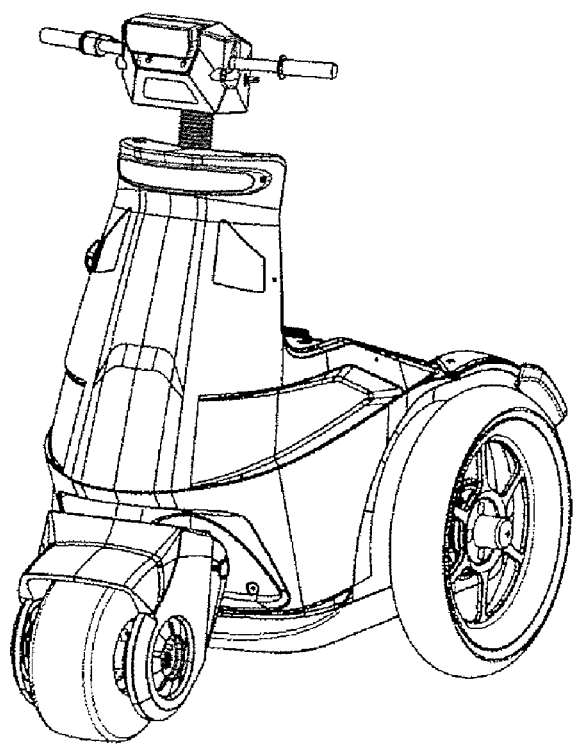
FIG. 1 is a view of a prior art vehicle in which the present invention may be used.
Figure 2:
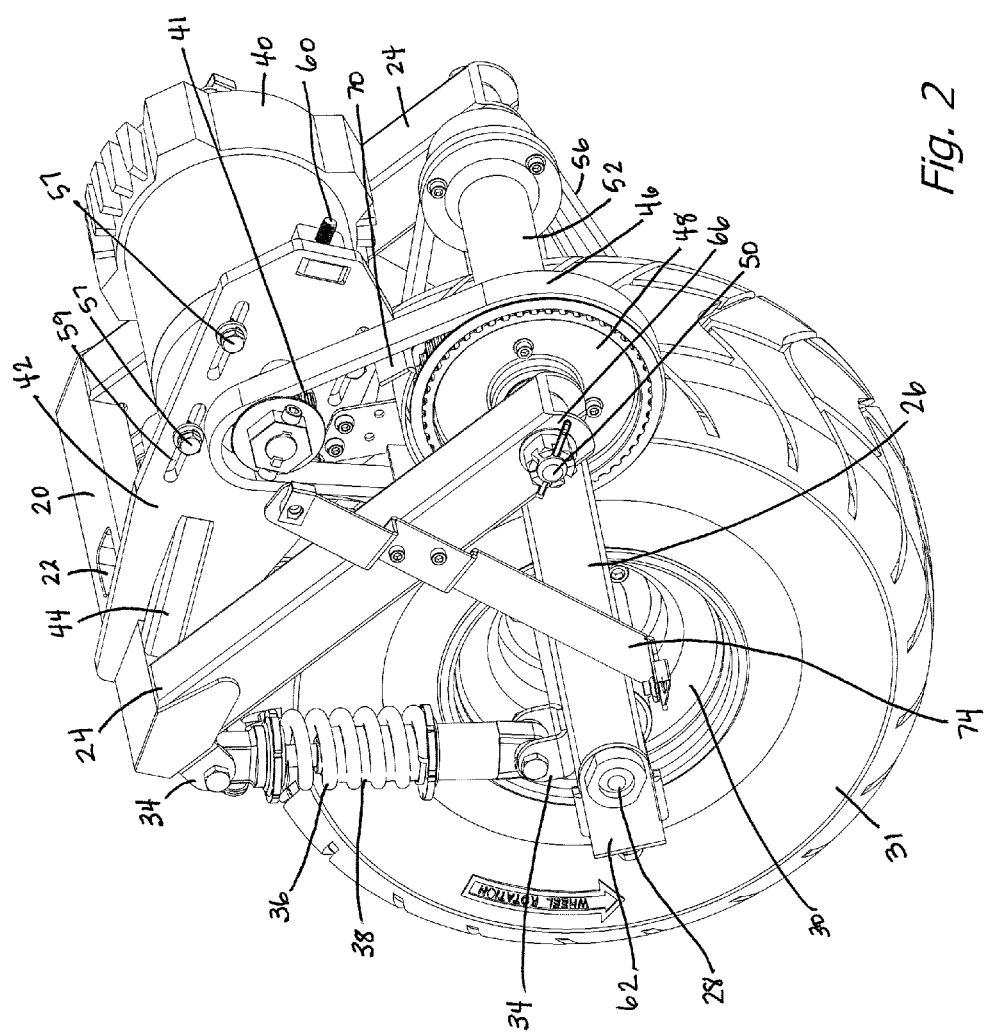
FIG. 2 is a first side perspective view of the suspension and drive of the present invention.
Figure 3:
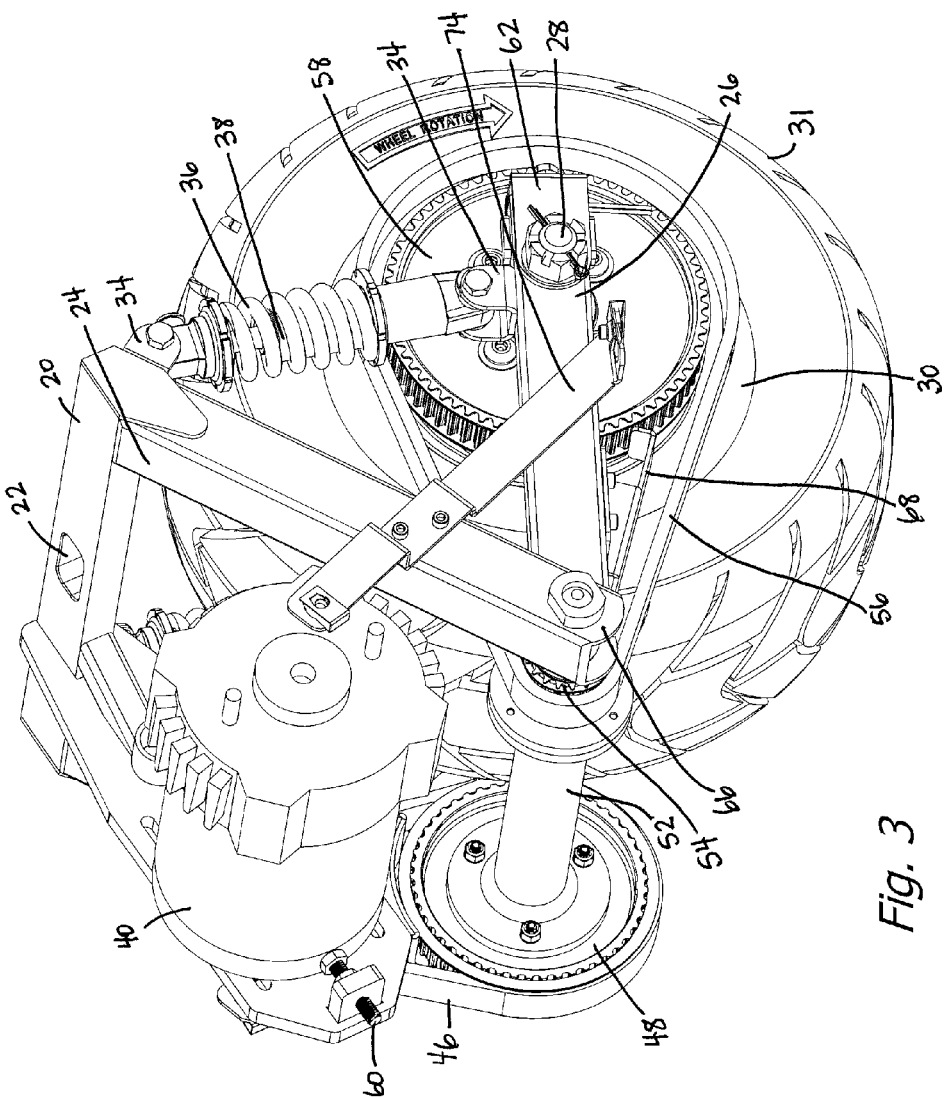
FIG. 3 is a second side perspective view of the suspension and drive system.
Figure 4:
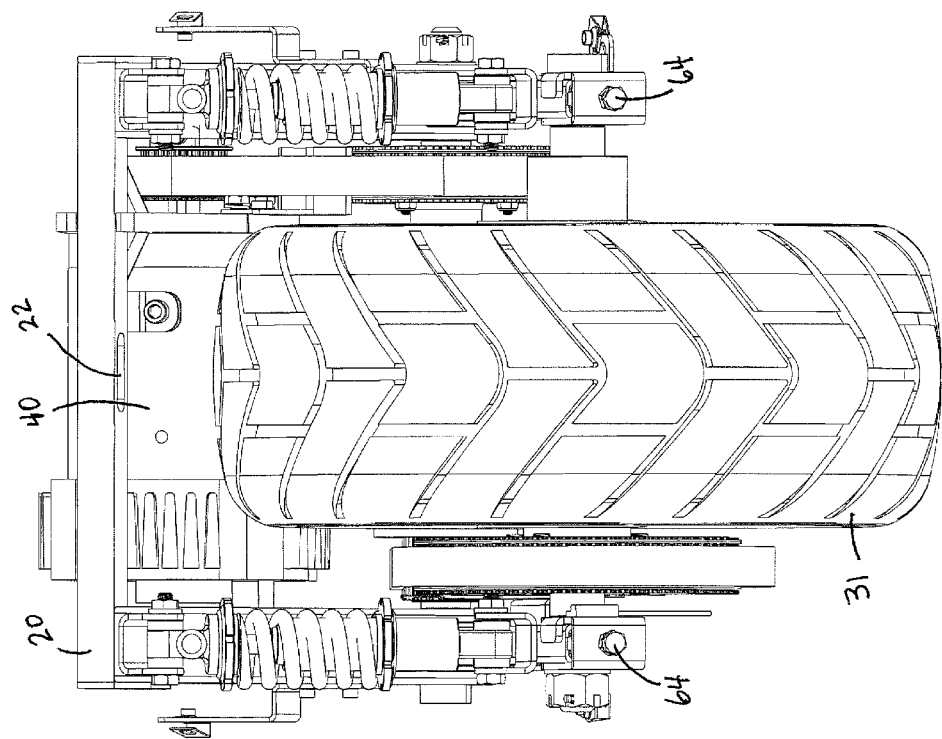
FIG. 4 is a front view of the drive and suspension of the present invention.

The present invention comprises a spring mounted drive wheel for an electric powered vehicle such as that shown in FIG. 1. FIG. 2 is a first side perspective view of the suspension and drive, FIG. 3 is an opposite side perspective view of the suspension and drive system, and FIG. 4 is a front view thereof. A main crossbar 20 has a socket-like opening 22 therein to which a steering post will be fastened. Welded to the main crossbar 20 are a pair of downward and rearward projecting struts 24 which provide support for swing arms 26, which support the axle 28, which in turn supports wheel 30 on bearings (not shown) of conventional design. Between the upper ends of struts 24 and the forward part of swing arms 26, just above axle 28, are clips 34 which support coil springs 36, each having a shock absorber 38 therein. The springs are generally chosen to support the weight applied to that wheel, with the swing arms 26 in a substantially level or horizontal position, as may be seen in FIG. 3. For the drive system, an electric motor 40 mounts on a plate 42 which is rigidly welded to the main crossbar 20 and further supported by a corner filler member 44 welded in place. The motor 40 has a toothed pulley 41 on the end of its shaft which drives a belt 46 that is connected to and drives a toothed pulley 48 supported on bearings on shaft 50. Coupled to toothed pulley 48 is a hollow counter shaft 52 having a smaller toothed pulley 54 (visible only in FIG. 3) having a toothed belt 56 driving wheel 30 and tire 31 through toothed pulley 48. Shaft 50 may be rigidly fastened to the adjacent ends of swing arms 26 so as to form a rigid "U" shape with the legs of the "U" extending to each side of the wheel 30 and tire 31, or not rigidly fastened, as desired.

Motor 40 is fastened to plate 42 by three bolts 57, each in a slot 59 in plate 42. This allows a screw 60 supported on plate 42 to be used to slide the motor toward main crossbar 20 before bolts 57 are tightened to provide the proper tension in belt 46. Similarly, wheel 30 is supported on axle 28 which passes through a U-shaped clip 62 at each end of the axle. The swing arms 26 have a hollow rectangular cross section which is closed, at least at the end adjacent axle 28, so that adjustment bolts 64, together with jam nuts (best seen in FIG. 4), may be tightened to slide axle 28 forward, away from each swing arm bearing in region 66 at each side of the suspension. This allows tightening of belt 56 as required, with the jam nuts then tightened to lock the adjustment bolts 64 in their set position.

Also visible in FIG. 3 is a member 68 which is disposed to strip the toothed belt 56 from the toothed pulley 58 in the event of a break in belt 56. A similar member 70, supported from plate 42 by extension 72 as may be seen in FIG. 2, is disposed to strip the toothed belt 46 from the toothed pulley 48 in the event of a break in belt 46. Also visible in these two Figures are straps 74. These are merely support for a fender such as the front fender in the prior art unit of FIG. 1, which keeps foreign matter, clothing, etc. away from the belt drive.

The preferred embodiment has been described herein with respect to the use of toothed belts and toothed pulleys, though conventional belts may be used if desired. It will be noted from the indication of the direction of wheel rotation in FIGS. 2 and 3 that the swing arms 26 project forward from their pivot axes as opposed to rearward for conventional swing arm suspension. By projecting forward, the tire may represent the forward most point of the system, yielding the appearance of the vehicle in accordance with FIG. 1. This also allows placement of the axis of rotation of the wheel somewhat forward of the axis of rotation of the steering column, as is normally done with tricycles, bicycles and motorcycles, and as is done in the prior art vehicle of FIG. 1. Reversing the arrangement shown in FIGS. 2 to 4 so that the forward motion of the vehicle would be in the opposite would put the countershaft 52 and pulleys associated therewith forward of the tire, which would be both aesthetically and functionally undesirable. Having the swing arms projecting forward from the pivot point is facilitated in part by making the nominal position of the swing arms approximately horizontal and using the shock absorber/spring assembly as limiting of the swing arm motion. Accordingly the present invention enhances the functionality while preserving the appearance of a front wheel drive device such as the prior art vehicle of FIG. 1. Thus the present invention has a number of aspects, which aspects may be practiced alone or in various combinations or sub-combinations, as desired. While a preferred embodiment of the present invention has been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A drive wheel and suspension for a vehicle comprising:
a cross member;
a support fastened to the cross member;
a motor mounted on the support for driving a motor shaft about a first axis;
a pair of spaced apart, downward and backward projecting parallel struts fastened to the cross member, backward being opposite the forward direction of motion of the vehicle;
a pair of swing arms, each swing arm being supported about a second axis parallel to the first axis and adjacent a lower end of a respective one of the struts and projecting forward;
a wheel mounted on an axle extending between a forward part of the swing arms to support a wheel between the swing arms for rotation about a third axis parallel to the first and second axes;
a pair of coil spring, shock absorber units, each coupled between the cross member and a respective forward end of a respective swing arm;
a first pulley on the motor shaft;
a second pulley aligned with the first pulley and disposed for rotation about the second axis;
a third pulley mechanically coupled to the second pulley so as to driven in rotation by the second pulley;
a fourth pulley aligned with the third pulley and mechanically coupled to the wheel to drive the wheel in rotation about the third axis;
a first belt coupling the first and second pulleys; and
a second belt coupling the third and fourth pulleys.

2. The drive wheel and suspension of claim 1 wherein the pulleys and the belts are toothed pulleys and belts.

3. The drive wheel and suspension of claim 1 wherein the cross member includes a socket for fastening to a steering post.

4. The drive wheel and suspension of claim 3 further comprising a pair of fender supports, each coupled to a side of the struts.

5. The drive wheel and suspension of claim 1 wherein the cross member includes a socket for fastening to a steering post of a three wheeled vehicle.

6. The drive wheel and suspension of claim 1 wherein when the drive wheel and suspension are mounted on a vehicle, the swing arms are substantially horizontal.

7. The drive wheel and suspension of claim 1 wherein the swing arms are rigidly coupled together to rotate in unison about the second axis.

8. The drive wheel and suspension of claim 1 wherein the swing arms are not rigidly coupled together to rotate in unison about the second axis.

* * * * *